C. B. WOOD.
Thill-Coupling.
No. 27,087.
Patented Feb. 7, 1860.
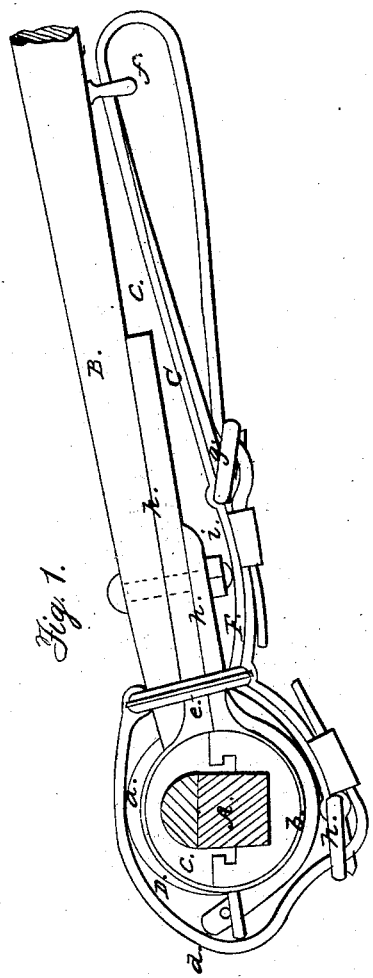
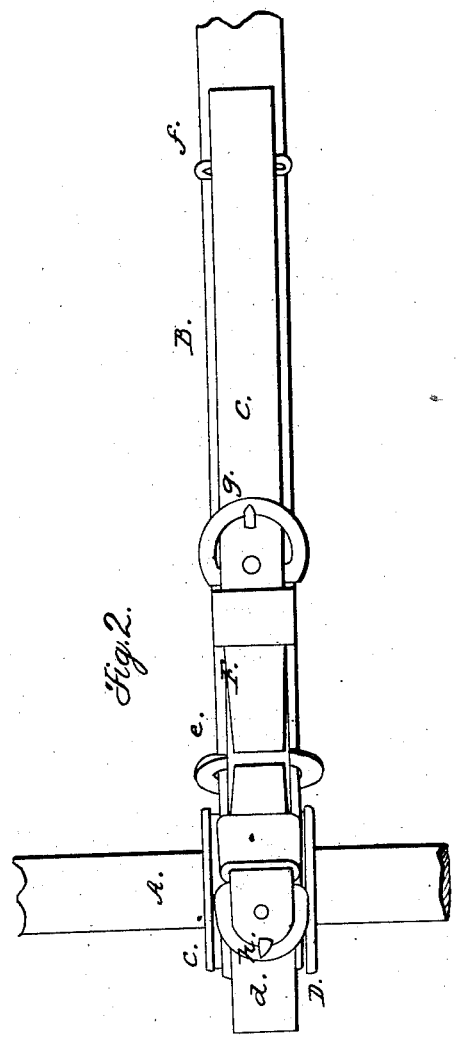
Witnesses:
M. W. Layston
Mich. Hughes
Inventor:
Chs. B. Wood

UNITED STATES PATENT OFFICE.

CHARLES B. WOOD, OF NEW YORK, N. Y.

SAFETY-STRAP FOR SECURING CARRIAGE-THILLS.

Specification of Letters Patent No. 27,087, dated February 7, 1860.

*To all whom it may concern:*

Be it known that I, CHARLES B. WOODS, of the city, county, and State of New York, have invented a new and Improved Safety-Strap for Vehicles; and I do hereby declare that the following is a full, clear, and exact description of the same reference being had to the annexed drawings, making a part of this specification, in which—

Figure 1, is a side view of my invention applied to the axle and thill of a vehicle. Fig. 2, an inverted plan of the same.

Similar letters of reference indicate corresponding parts in the two figures.

This invention relates to an improvement in straps that are attached to the thills, and axles of vehicles in order to guard against accidents that might occur from the breaking of the permanent metal connections used for securing the thills to the axle.

The object of the invention is to form not only a supplemental or auxiliary attachment of the thills to the axle, but also to obtain a fastening for the parts of the eyes or metal conections that are attached to the thills, in case the same should become detached from the thills.

To enable those skilled in the art to fully understand and construct my invention I will proceed to describe it.

A, represents a portion of the front axle of a vehicle. B, are of the thills.

C, is a clip on the axle and D, is an eye formed of two parts $a$, $b$, both of which are shown in Fig. 1.

F, is a strap which is formed of two parts $c$, $d$, connected by a ring $e$, which may be of metal covered with leather. The outer end of the part $c$, of the strap F, is passed through a loop $f$, attached to the under side of the thill B, beyond the parts $a$, $b$, of the eye E, and is secured in the loop by a buckle $g$. The inner end of the part $e$, has a buckle $h$, attached to it by which the part $d$, of the strap is attached to the inner part of $c$. The part $d$, of the strap encompasses the axle A, and the ring $e$, encompasses the thill and the shanks $h$, $h$, of the parts $a$, $b$, of the eye as shown clearly in Fig. 1.

From the above description it will be seen that if the thill become detached from the axle A, in consequence of its connection breaking or giving way at any point between the loop $f$, and the axle, the strap F, will serve as a temporary connection and retain the thill in proper place, and it will also be seen that in case the lower part $b$, of the eye become detached from the upper part $a$, the ring $e$, will retain said part, preventing it from dropping and becoming lost. This is an important feature of the invention for in case of the nut of the bolt $i$, becoming detached the part $b$, of the eye will not be lost. These nuts are frequently removed designedly, especially in livery stables. If a nut is lost on one vehicle, the owner frequently if not very scrupulous, will in order to replace it remove a nut from a neighboring vehicle. The rings $e$, will prove serviceable in all cases where the parts of the connection that are attached to the thills are subject to be lost in case of breakage.

I am aware that safety straps have been attached to thills and axles in order to guard against the danger attending the breaking or giving way of the metal connection between the thills and axles, but I am not aware that a ring has been employed for the purpose of retaining or holding any parts of the connection which might become detached either by breakage or otherwise.

I do not claim therefore broadly and separately the employment or use of a safety strap, but, I do claim as new and desire to secure by Letters Patent, The strap F, formed of two parts $c$, $d$, provided with a ring $e$, and applied to the axle and thills substantially as and for the purpose herein set forth.

CHAS. B. WOOD.

Witnesses:
   M. M. LIVINGSTON,
   MICH HUGHES.